US012652129B2

(12) United States Patent
Liang et al.

(10) Patent No.: US 12,652,129 B2
(45) Date of Patent: Jun. 9, 2026

(54) METHOD FOR CONTROLLING RETRANSMISSION IN PHYSICAL LAYER

(71) Applicant: NOREL SYSTEMS LIMITED, Tianjin (CN)

(72) Inventors: Ke Liang, Tianjin (CN); Yuanlong Wang, Tianjin (CN)

(73) Assignee: NOREL SYSTEMS LIMITED, Tianjin (CN)

( * ) Notice: Subject to any disclaimer, the term of this patent is extended or adjusted under 35 U.S.C. 154(b) by 386 days.

(21) Appl. No.: 18/228,779

(22) Filed: Aug. 1, 2023

(65) Prior Publication Data

US 2023/0379085 A1      Nov. 23, 2023

Related U.S. Application Data

(63) Continuation of application No. PCT/CN2022/071738, filed on Jan. 13, 2022.

(30) Foreign Application Priority Data

Apr. 2, 2021      (CN) ......................... 202110362472.1

(51) Int. Cl.
*H04L 1/1607*      (2023.01)
(52) U.S. Cl.
CPC .................................. *H04L 1/1671* (2013.01)
(58) Field of Classification Search
CPC ......... H04L 1/1671; H04L 1/08; H04L 1/189; H04L 1/1864
See application file for complete search history.

(56) References Cited

U.S. PATENT DOCUMENTS

2008/0043619 A1      2/2008   Sammour et al.
2012/0026892 A1 *    2/2012   Nakao ................... H04L 1/1861
                                                                    370/242
(Continued)

FOREIGN PATENT DOCUMENTS

CN            1464677 A        12/2003
CN            1856948 A    *   11/2006   ........ H04W 74/0841
(Continued)

OTHER PUBLICATIONS

International Search Report, PCT/CN2022/071738, Apr. 13, 2022.

*Primary Examiner* — Phong La
(74) *Attorney, Agent, or Firm* — Troutman Pepper Locke LLP; Tim Tingkang Xia, Esq.

(57)      ABSTRACT

A physical layer retransmission control method is used for retransmission control of a transmission system. The transmission system includes a first transmission terminal, a second transmission terminal and a transmission channel. The first transmission terminal sends downlink data packets to the second transmission terminal through the transmission channel. The second transmission terminal sends retransmission control information to the first transmission terminal through the transmission channel. Each downlink data packet includes a sequence number and an abnormal state field. The sequence numbers in the consecutive downlink data packets are arranged in the order of transmission. The abnormal state field indicates the abnormal state of the data of the first transmission terminal. If the second transmission terminal judges an error in the downlink data packet, it sends retransmission control information to the first transmission terminal, and the first transmission terminal retransmits the downlink data packet to the second transmission terminal accordingly.

20 Claims, 10 Drawing Sheets

(56) References Cited

U.S. PATENT DOCUMENTS

| | | | | |
|---|---|---|---|---|
| 2021/0306111 A1* | 9/2021 | Jung | ..................... | H04L 1/1671 |
| 2022/0417976 A1* | 12/2022 | Park | ..................... | H04L 5/0053 |
| 2023/0246744 A1* | 8/2023 | Yoshioka | ............. | H04W 28/04 |
| | | | | 370/328 |
| 2023/0379085 A1* | 11/2023 | Liang | ................... | H04L 1/1671 |
| 2023/0389001 A1* | 11/2023 | Shin | ..................... | H04L 1/0068 |

FOREIGN PATENT DOCUMENTS

| | | | | | |
|---|---|---|---|---|---|
| CN | 102684852 | A | * | 9/2012 | .......... H04L 1/1854 |
| CN | 103401667 | A | | 11/2013 | |
| CN | 103703859 | A | * | 4/2014 | .......... H04W 24/10 |
| CN | 104066128 | A | * | 9/2014 | |
| CN | 103458398 | B | * | 2/2017 | |
| CN | 109743143 | A | | 5/2019 | |
| CN | 110830818 | A | | 2/2020 | |
| CN | 113132063 | A | | 7/2021 | |
| CN | 113840342 | A | * | 12/2021 | ........... H04W 36/08 |
| WO | WO-2022022727 | A1 | * | 2/2022 | ........... H04L 1/1874 |

* cited by examiner

First transmission terminal

Second transmission terminal

1

METHOD FOR CONTROLLING RETRANSMISSION IN PHYSICAL LAYER

CROSS-REFERENCE TO RELATED APPLICATION

This application is a continuation application of International Patent Application No. PCT/CN2022/071738, filed on Jan. 13, 2022, which itself claims priority to and benefit of Chinese Patent Application No. 202110362472.1 filed on Apr. 2, 2021 in the State Intellectual Property Office of P. R. China. The disclosure of each of the above applications is incorporated herein by reference in its entirety.

TECHNICAL FIELD

The present invention relates to the technical field of communication, in particular to a retransmission control method.

BACKGROUND

Retransmission is a common method to ensure the reliability of data transmission in transmission system. Retransmission mechanism is often used as a part of upper layer protocols such as transport layer, such as TCP protocol, and is usually implemented by software. Compared with the retransmission in the upper layer protocol, the retransmission in the physical layer is beneficial to reduce the delay of retransmitted data, which is particularly important in applications that require strict data transmission delay, such as in-vehicle assisted driving system. The existing retransmission control methods implemented in the physical layer are complex, which leads to more resource consumption. Therefore, it is necessary to study a new retransmission control method in the physical layer, so as to simplify the implementation method and reduce the resource overhead while ensuring the reliability of data transmission and reducing the retransmission delay.

SUMMARY

The technical problem to be solved by the present invention is how to realize a retransmission control method in the physical layer to ensure the reliability of data transmission and reduce the delay of retransmitting data, and at the same time simplify the implementation method and reduce the resource overhead.

In order to solve the technical problems, the technical scheme adopted by the present invention is as follows:

As a physical layer retransmission control method of the present invention, it is used for retransmission control of a transmission system, which comprises a first transmission terminal, a second transmission terminal and a transmission channel, wherein the first transmission terminal sends downlink data packets to the second transmission terminal through the transmission channel, and the second transmission terminal sends retransmission control information to the first transmission terminal through the transmission channel.

Each downlink data packet comprises a sequence number, and a plurality of sequence numbers comprised in a plurality of consecutive downlink data packets are arranged in sequence according to in the order of transmission. The second transmission terminal receives the downlink data packet sent by the first transmission terminal, judges the correctness of the downlink data packet, and generates retransmission control information if it is judged that the downlink data packet has an error, and sends the data packet to the first transmission terminal. The retransmission control information comprises a retransmission data packet sequence number. The first transmission terminal resends the downlink data packet to the second transmission terminal according to the retransmission control information.

The downlink data packet also comprises an abnormal state field, which is used to indicate the data abnormal state of the first transmission terminal; when the downlink data packet to be retransmitted cannot be read from a sending memory, the first transmission terminal has the data abnormal state.

In the first transmission terminal, when the data abnormal state of the occurs, the first transmission terminal modifies a value of the abnormal state field in the downstream data packet sent subsequently. When the value of the abnormal state field in the downlink data packet received by the second transmission terminal is different from the value of the abnormal state field in the downlink data packet received last time, the waiting for the downlink data packet to be retransmitted is given up.

Preferably, the method for judging the correctness of the downlink data packet is that the second transmission terminal decodes and judges check codes in the received downlink data packets.

Preferably, the method for judging the correctness of the downlink data packet is that the second transmission terminal judges the continuity of the sequence numbers in the received downlink data packets.

Preferably, the method for judging the correctness of the downlink data packet comprises the following steps: after receiving a downlink data packet, the second transmission terminal judges whether a next downlink data packet has not been received after a first preset time.

Preferably, the method for judging the correctness of the downlink data packet comprises the following steps: after the second transmission terminal sends the retransmission control information, judging whether a downlink data packet with the retransmission data packet sequence number has not been received after a second preset time.

Preferably, the first transmission terminal retransmitting the downlink data packet to the second transmission terminal according to the retransmission control information refers to the first transmission terminal retransmitting only the downlink data packet with the retransmission data packet sequence number to the second transmission terminal.

Preferably, the first transmission terminal retransmitting the downlink data packet to the second transmission terminal according to the retransmission control information refers to the first transmission terminal retransmitting the downlink data packet with the retransmission data packet sequence number and all downlink data packets with the sequence numbers after the retransmission data packet sequence number to the second transmission terminal.

Preferably, the retransmission control information further comprises a multi-data packet retransmission enable field; the first transmission terminal retransmitting the downlink data packet to the second transmission terminal according to the retransmission control information refers to the first transmission terminal retransmitting only the downlink data packet with the retransmission data packet sequence number to the second transmission terminal according to the multi-data packet retransmission enable field, or the first transmission terminal retransmitting the downlink data packet with the retransmission data packet sequence number and all downlink data packets with the sequence numbers after the retransmission data packet sequence number to the second transmission terminal.

Preferably, after repeatedly sending retransmission control information comprising the same retransmission data packet sequence number for a preset number of times, the second transmission terminal gives up waiting for the downlink data packet if the downlink data packet with the retransmission data packet sequence number has not been received.

Preferably, the retransmission control information further comprises a forced abnormal state transition field; after repeatedly sending retransmission control information comprising the same retransmission data packet sequence number for a preset number of times, the second transmission terminal judges whether the downlink data packet with the retransmission data packet sequence number has not been received, and sets the forced abnormal state transition field according to a judgment result. When the forced abnormal state transition field in the received retransmission control information is a preset value, the first transmission terminal modifies the value of the abnormal state field in a downlink data packet sent subsequently.

Preferably, the retransmission control information further comprises an abnormal state return field; the second transmission terminal sets the abnormal state return field in the retransmission control information as the value of the abnormal state field in the downlink data packet received before sending the retransmission control information. When the value of the abnormal state return field in the received retransmission control information is different from that in the current downlink data packet, the first transmission terminal ignores the retransmission control information.

The present invention has the beneficial effects that:

the present invention relates to a physical layer retransmission control method; an abnormal state field is added to a downlink data packet to indicate the abnormal state of data of a first transmission terminal; when the downlink data packet to be retransmitted cannot be read from a sending memory, the first transmission terminal appears the abnormal state of data; this method ensures the reliability of data transmission, reduces the delay of retransmitting data, simplifies the implementation method and reduces the resource overhead.

Figure 6:
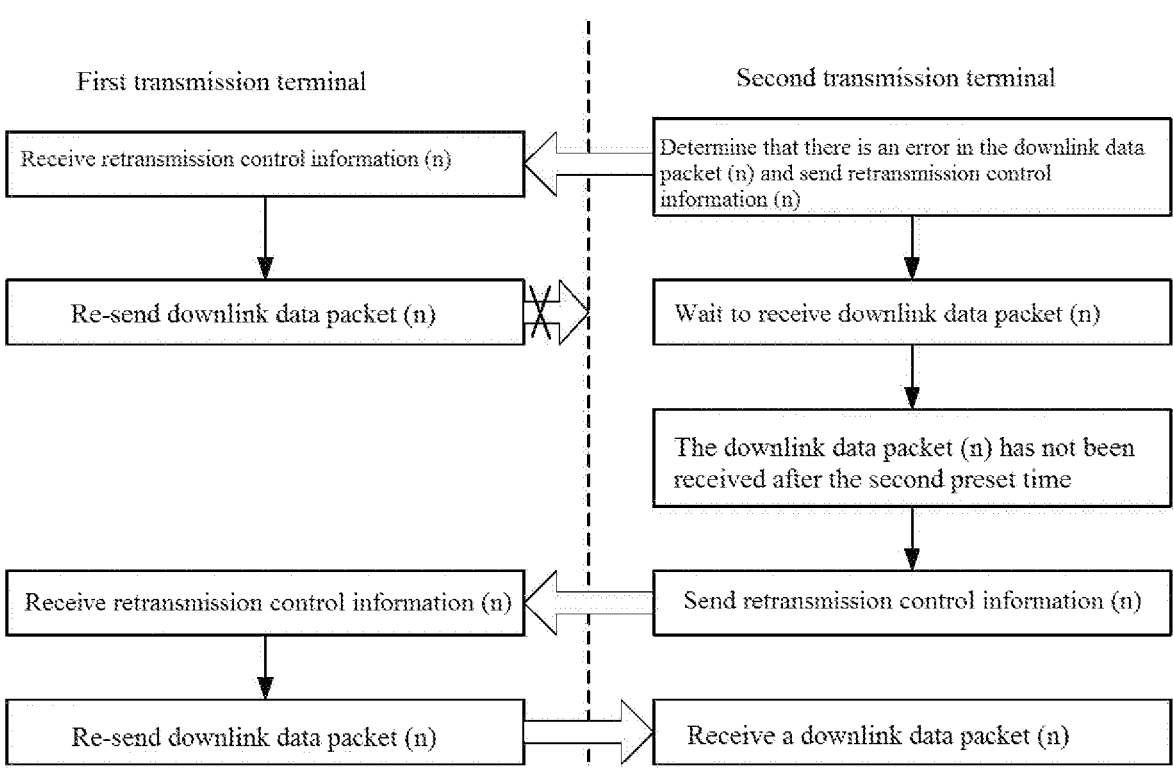
Figure 7:
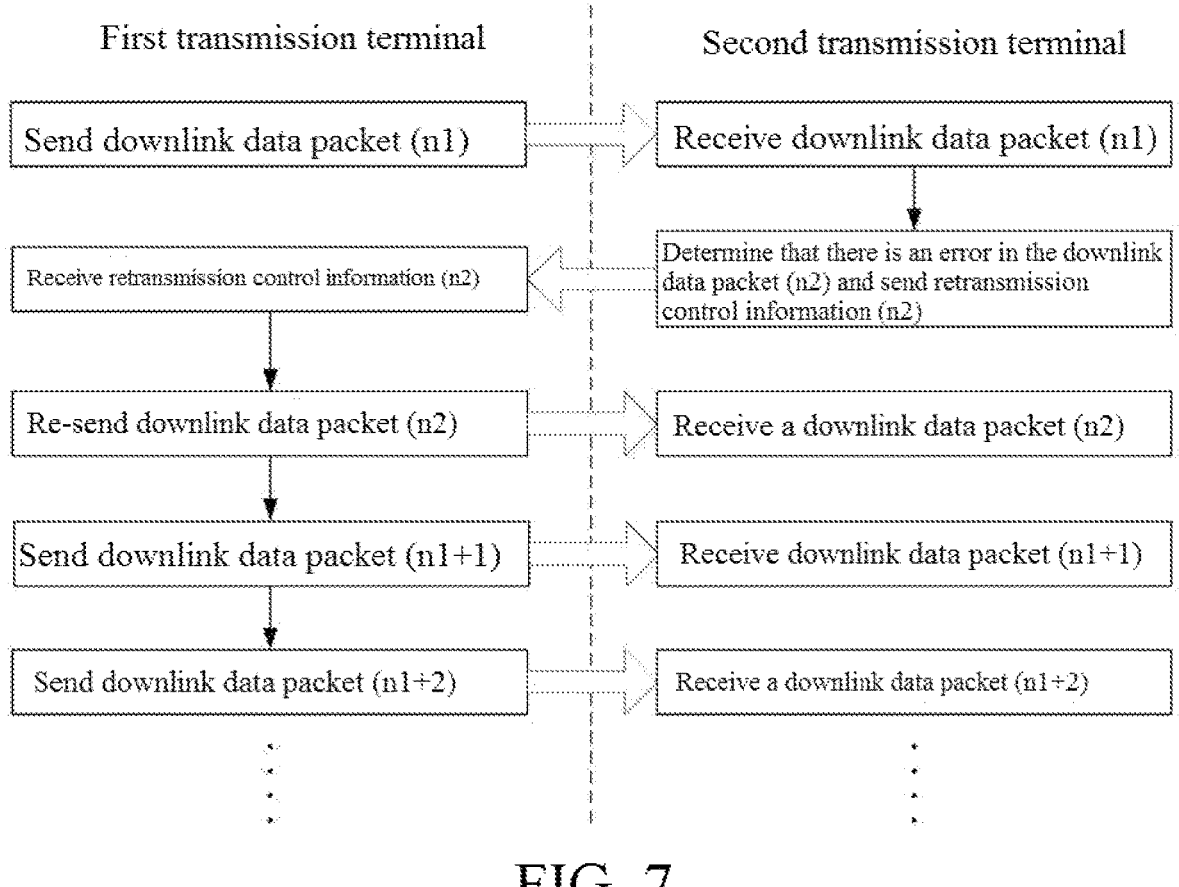
Figure 8:
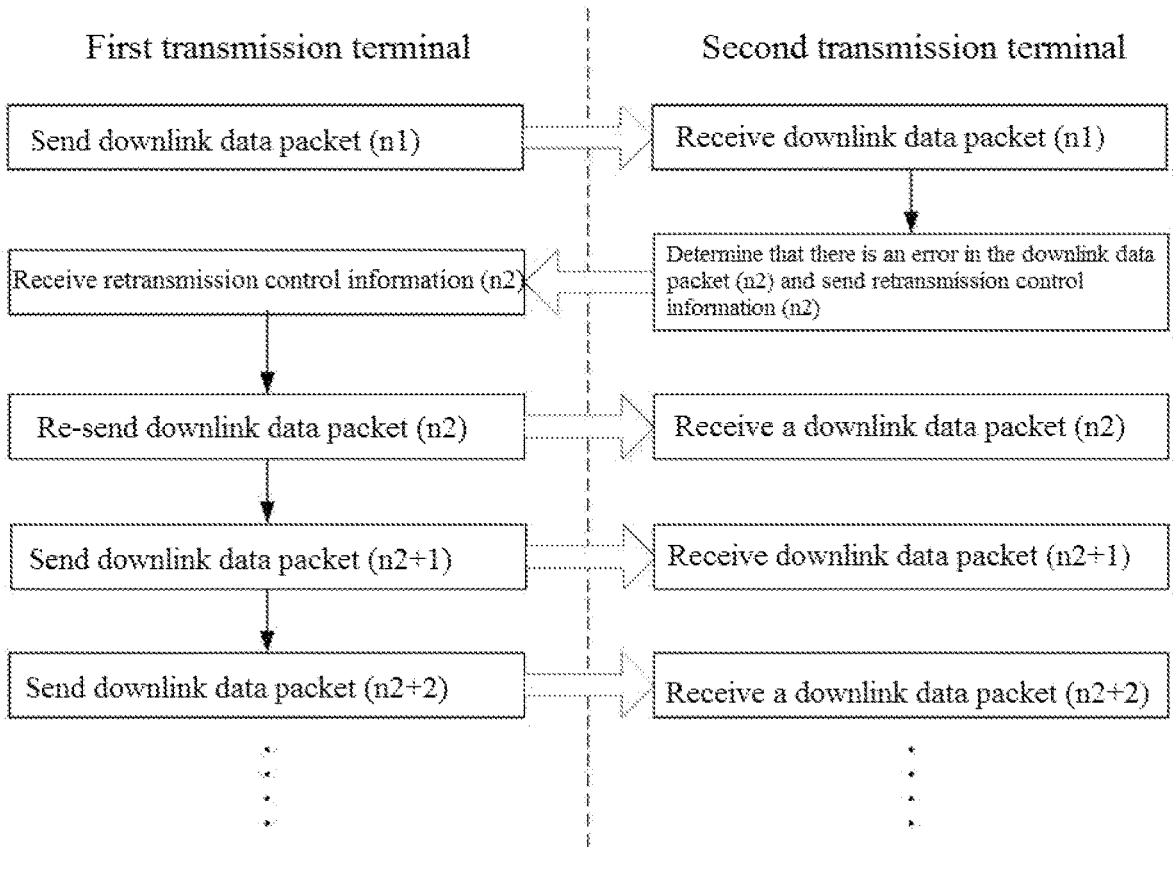
Figure 9:
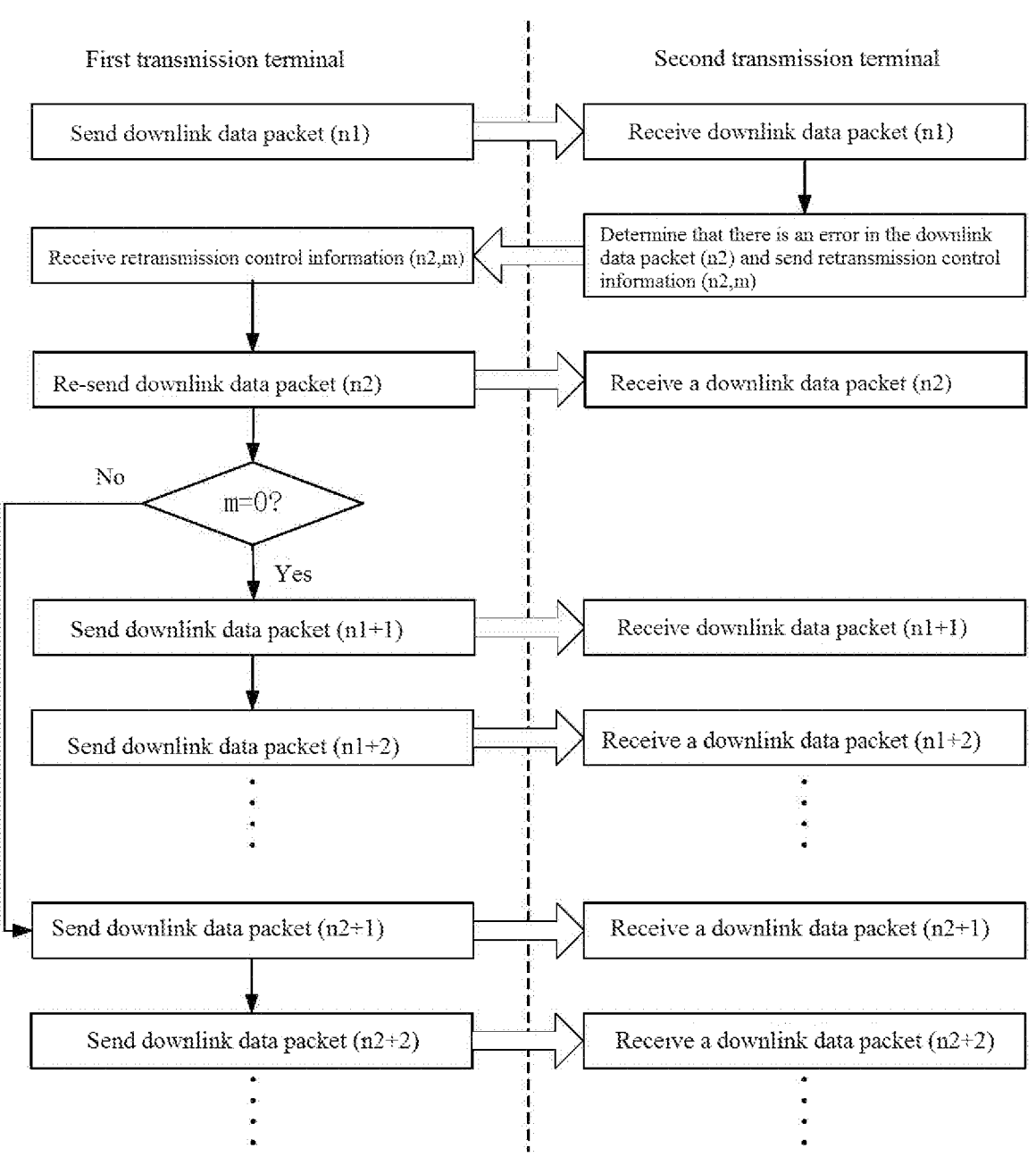
Figure 10:
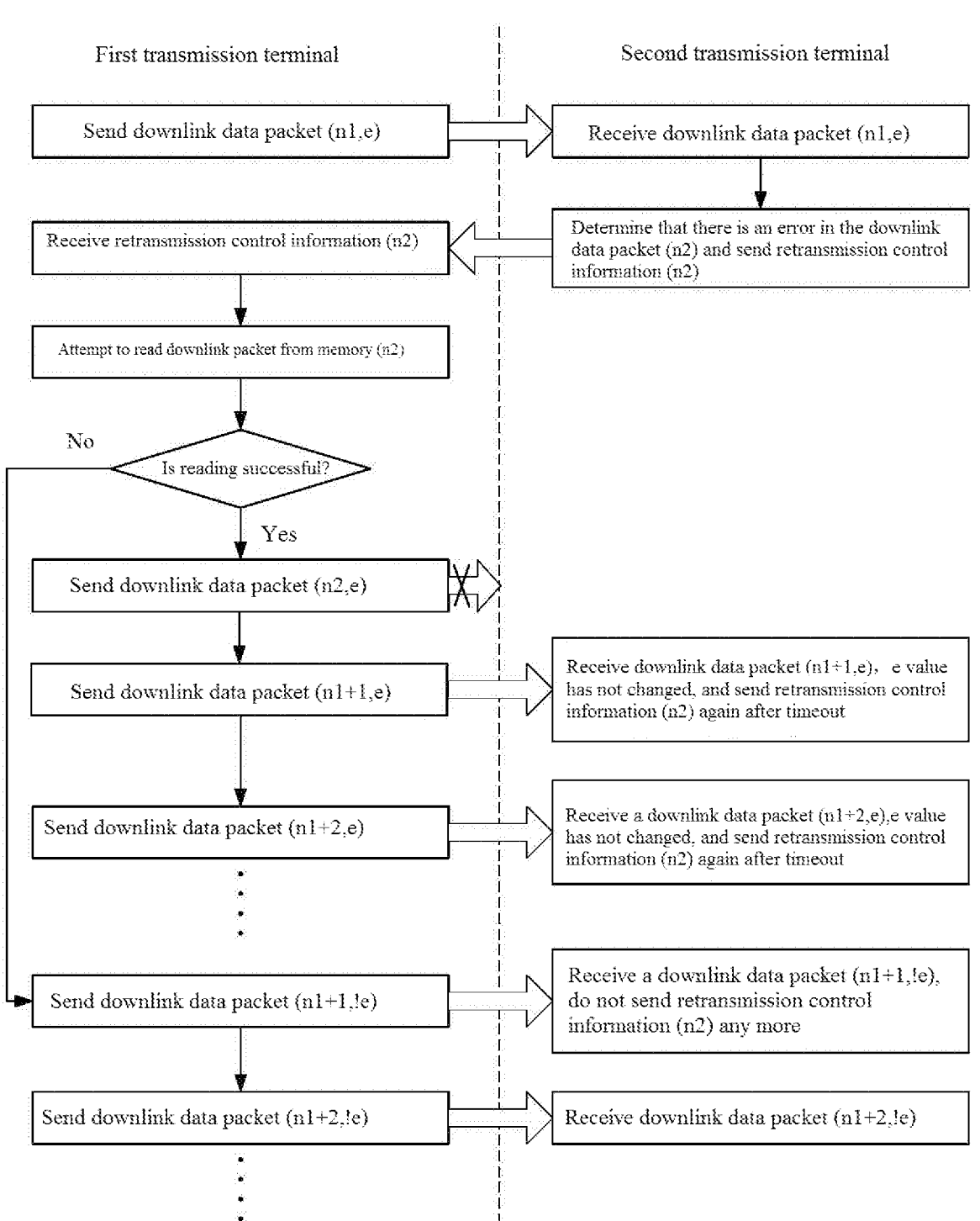
Figure 11:
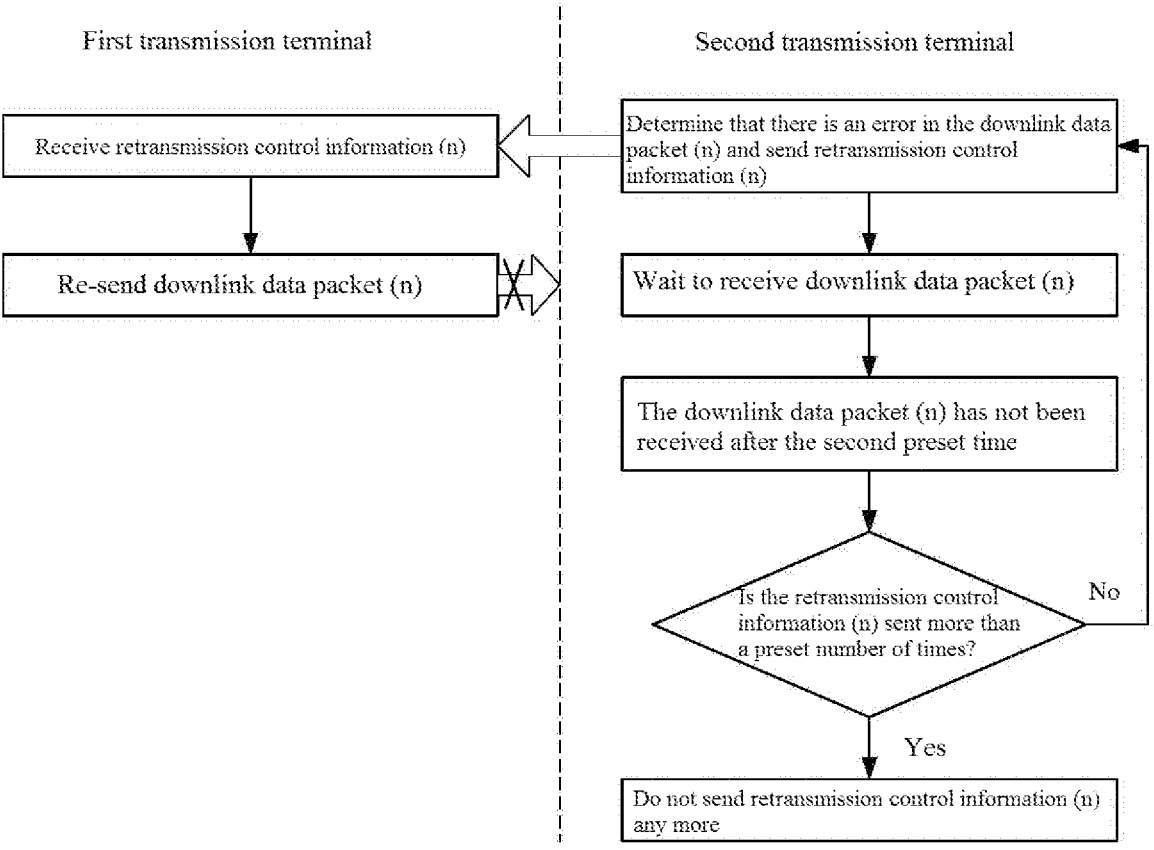
Figure 12:
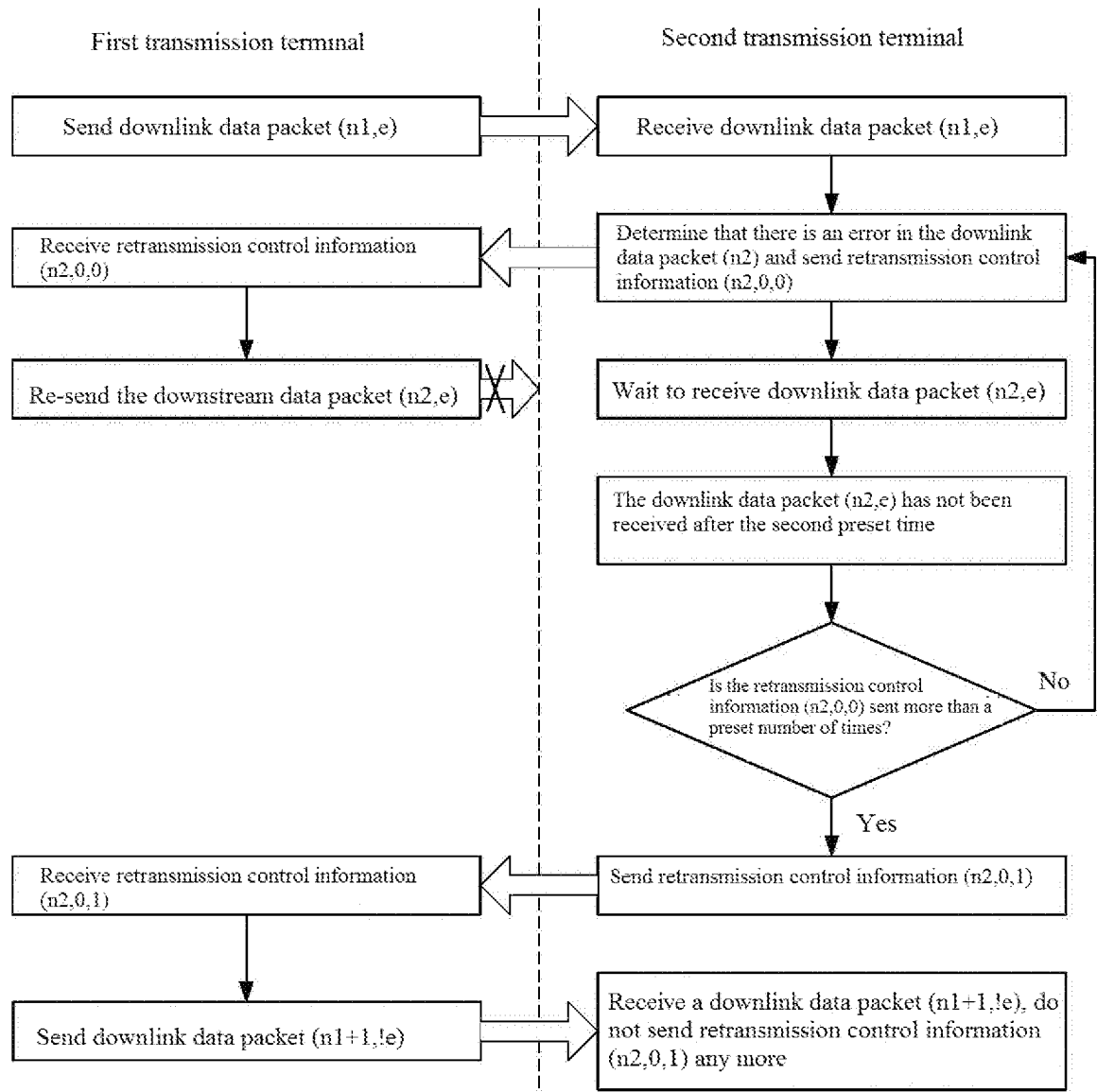
Figure 13:
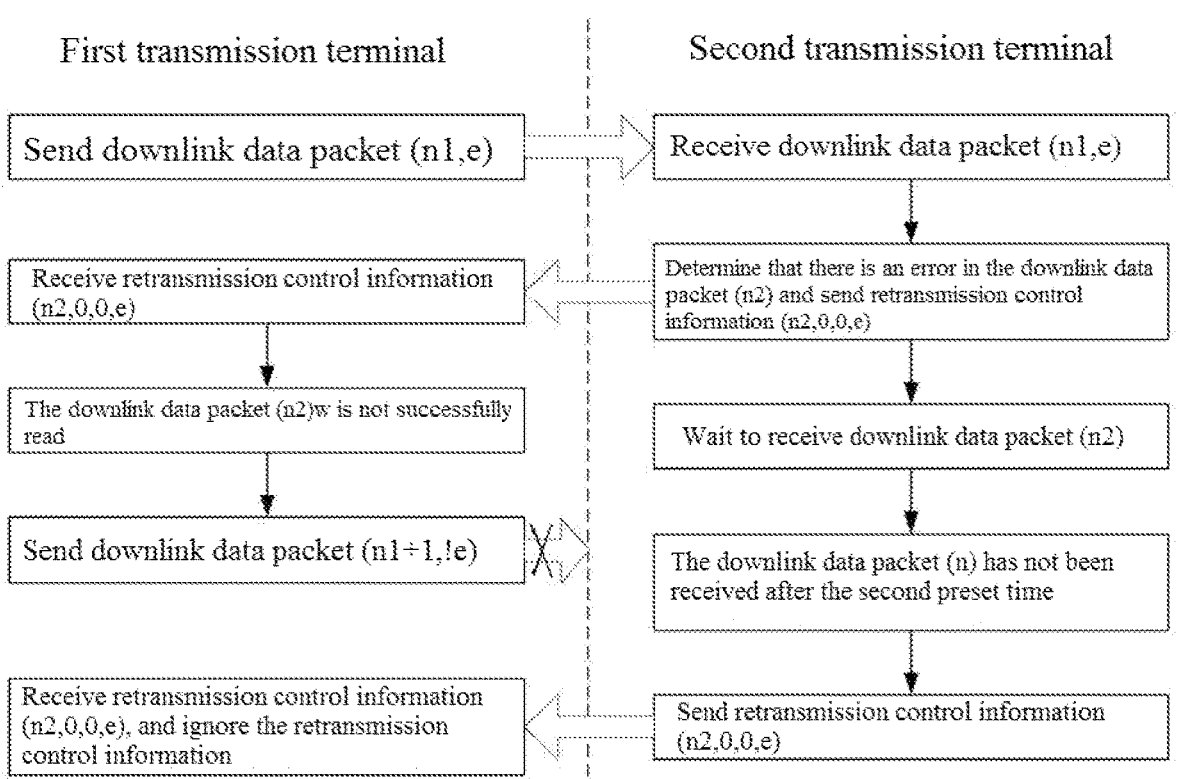

4 tion, which is another method for the second transmission terminal to judge the correctness of the downlink data packet;

FIG. 6 is a data retransmission flow chart of a physical layer retransmission control method of the present invention, which is another method for the second transmission terminal to judge the correctness of the downlink data packet;

FIG. 7 is a data retransmission flow chart of a physical layer retransmission control method according to the present invention, which is a method for retransmitting downlink data packets according to a sequence number;

FIG. 8 is a data retransmission flow chart of a physical layer retransmission control method according to the present invention, which is another method for retransmitting downlink data packets according to sequence numbers;

FIG. 9 is a data retransmission flow chart of a physical layer retransmission control method according to the present invention, which is a method for retransmitting downlink data packets according to a sequence number and a multi-data packet retransmission enable field;

FIG. 10 is a data retransmission flow chart of a physical layer retransmission control method according to the present invention, which is a method of retransmitting a downlink data packet according to an abnormal state field;

FIG. 11 is a data retransmission flow chart of a physical layer retransmission control method according to the present invention, which is a processing method of a second transmission terminal after retransmitting downlink data packets for a preset number of times;

FIG. 12 is a data retransmission flow chart of a physical layer retransmission control method according to the present invention, which is another processing method after the second transmission terminal retransmits the downlink data packet for a preset number of times;

FIG. 13 is a data retransmission flow chart of a physical layer retransmission control method of the present invention, which is a method of retransmitting downlink data packets according to an abnormal state field and an abnormal state return field.

In the figures:
1 First transmission terminal
2 Second transmission terminal
3 Transmission channel
11 Sending memory

DETAILED DESCRIPTION OF EMBODIMENTS

The technical scheme in the embodiment of the present invention will be described clearly and completely with the attached drawings. It can be understood that the described embodiment is only a part of the embodiment of the present invention, but not the whole embodiment. Based on the embodiments of the present invention, all other embodiments obtained by those skilled in the art without creative work belong to the scope of protection of the present invention.

The present invention provides a physical layer retransmission control method, which is used for retransmission control of a transmission system.

Figure 1:
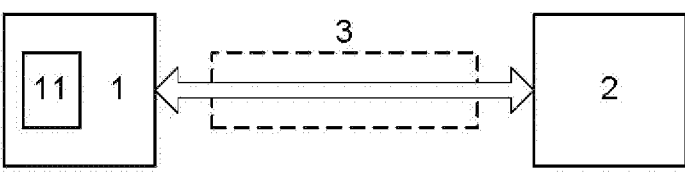
FIG. 1 is a transmission system block diagram of a physical layer retransmission control method of the present invention.

As shown in FIG. 1, the transmission system includes a first transmission terminal 1, a second transmission terminal 2, and a transmission channel 3. The first transmission terminal 1 sends downlink data packets to the second transmission terminal 2 through the transmission channel 3, and the second transmission terminal 2 sends retransmission control information to the first transmission terminal 1 through the transmission channel 3. The first transmission terminal 1 includes a sending memory 11, and the first transmission terminal 1 reads and transmits downlink data packets from the sending memory 11.

Each downlink data packet comprises a sequence number, and if the sequence number of the downlink data packet is n, the downlink data packet is recorded as a downlink data packet (n). A plurality of sequence numbers comprised in a plurality consecutive downlink data packets are arranged in in the order of transmission. For example, when all downlink data packets can be correctly received by the second transmission terminal 2, the sequence number of the downlink data packet sent by the first transmission terminal 1 each time is the sequence number of the downlink data packet sent by the first transmission terminal 1 the previous time plus 1, and when it reaches the preset maximum value, the sequence number of the next downlink data packet is 0. If the first transmission terminal 1 sends a downlink data packet (n), the downlink data packet (n+1), downlink data packet (n+2), downlink data packet (n+3), . . . will be sent in turn subsequently. If the preset maximum value of the sequence number of the downlink data packet is Nmax, and the first transmission terminal 1 sends the downlink data packet (Nmax), the downlink data packet (0), downlink data packet (1), downlink data packet (2), . . . will be sent in turn subsequently.

Figure 2:
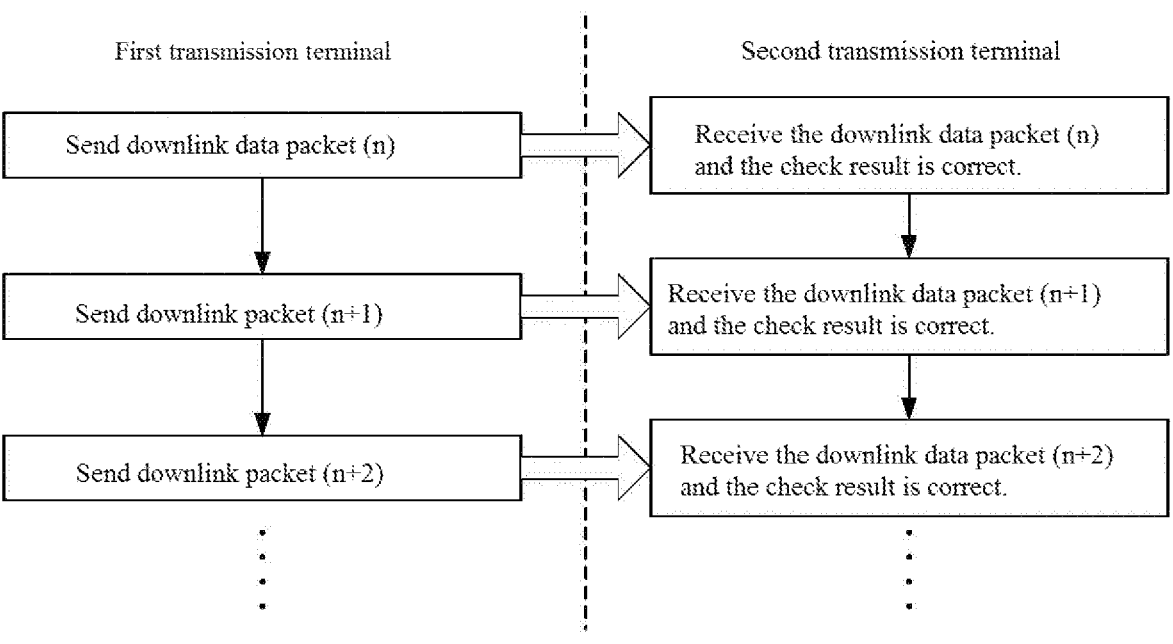
FIG. 2 is a flow chart of sending and receiving correct data in a physical layer retransmission control method of the present invention.

As shown in FIG. 2, the first transmission terminal 1 sends the downlink data packet (n) through the transmission channel 3, and the second transmission terminal 2 receives the downlink data packet (n) and checks it. If the check result is correct, the second transmission terminal 2 waits to receive the next downlink data packet (n+1) sent by the first transmission terminal 1. The first transmission terminal 1 sends downlink data packets including downlink data packet (n+1) and downlink data packets (n+2) with sequence numbers after n to the second transmission terminal 2, and the second transmission terminal 2 receives these downlink data packets and checks them, and the check result is correct.

The first transmission terminal 1 sends the downlink data packet through the transmission channel 3, and the second transmission terminal 2 receives the downlink data packet, and judges the correctness of the downlink data packet. If it is judged that there is an error in the downlink data packet, the second transmission terminal 2 generates retransmission control information and sends it to the first transmission terminal 1. After receiving the retransmission control information, the first transmission terminal 1 reads the downlink data packet with the retransmission data packet sequence number from the sending memory 11, and retransmits it to the second transmission terminal 2 through the transmission channel 3.

If the retransmission data packet sequence number in the retransmission control information is n, the retransmission control information is recorded as retransmission control information (n).

The present invention only performs retransmission control on the wrong data packet, and does not perform feedback confirmation on the correct data packet. This method is mostly used in asymmetric transmission systems, and the transmission channels in the asymmetric transmission system are divided into uplink transmission channels and downlink transmission channels, which are used for transmitting uplink data and downlink data respectively. In an asymmetric transmission system, the uplink data transmission rate is different from the downlink data transmission rate, so the bandwidth of the uplink transmission channel is different from that of the downlink transmission channel. In one embodiment of the present invention, the downlink data transmission rate is greater than the uplink data transmission rate, so the bandwidth of the downlink transmission channel is greater than that of the uplink transmission channel. Retransmission control only for erroneous data packets is beneficial to sending retransmission control information in time through the uplink transmission channel with small bandwidth.

An application embodiment of the present invention provides a method for the second transmission terminal 2 to judge the correctness of the downlink data packet: the second transmission terminal 2 decodes and judges the check codes in the received downlink data packet, where the check codes include error detection codes and error correction codes, and commonly used ones include cyclic redundancy check codes, parity check codes, Hamming codes, convolutional codes, Reed-Solomon codes (RS codes), BCH codes and LDPC codes.

Figure 3:
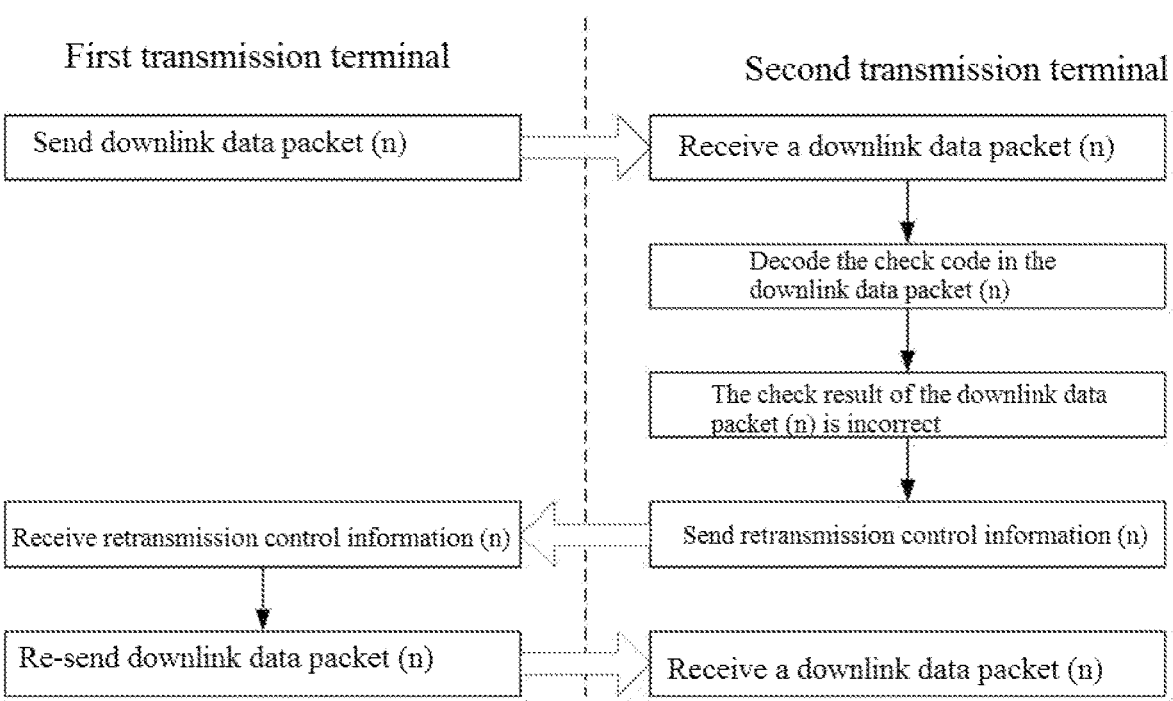
FIG. 3 is a data retransmission flow chart of a physical layer retransmission control method of the present invention, which is a method for the second transmission terminal to judge the correctness of the downlink data packet.

As shown in FIG. 3, the first transmission terminal 1 sends a downlink data packet (n) to the second transmission terminal 2. After receiving the downlink data packet (n), the second transmission terminal 2 decodes the check code in the downlink data packet (n). If the check result of the downlink data packet (n) is wrong, it is judged that there is an error in the downlink data packet (n), and the second transmission terminal 2 sends retransmission control information (n) to the first transmission terminal 1. After receiving the retransmission control information (n), the first transmission terminal 1 retransmits the downlink data packet (n), and the second transmission terminal 2 receives the downlink data packet again (n).

Another application embodiment of the present invention provides another method for the second transmission terminal 2 to judge the correctness of the downlink data packet: the second transmission terminal 2 judges the continuity of the sequence number in the received downlink data packet.

Figure 4:
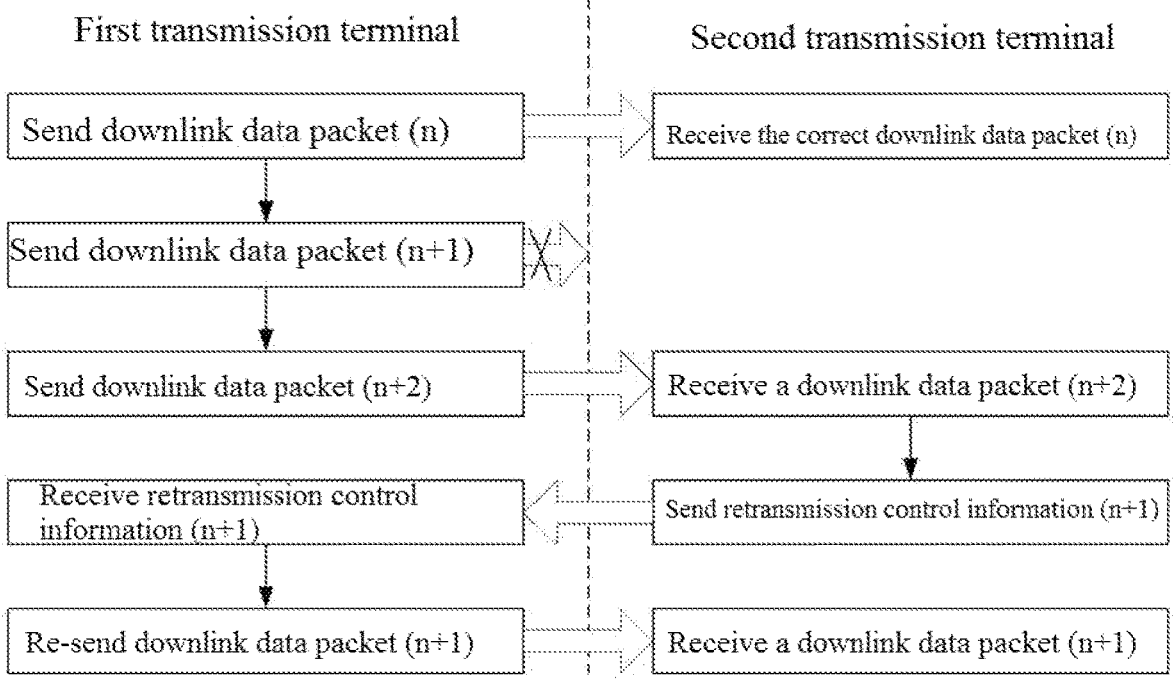
FIG. 4 is a data retransmission flow chart of a physical layer retransmission control method according to the present invention, which is another method for the second transmission terminal to judge the correctness of the downlink data packet.

As shown in FIG. 4, the first transmission terminal 1 sends a downlink data packet (n) to the second transmission terminal 2, and the second transmission terminal 2 receives the correct downlink data packet (n). The first transmission terminal 1 sends the downlink data packet (n+1), but the downlink data packet (n+1) is incorrectly received by the second transmission terminal 2 due to an error during transmission. The first transmission terminal 1 sends the downlink data packet (n+2), and the second transmission terminal 2 receives the correct downlink data packet (n+2). The second transmission terminal 2 determines that there is an error in the downlink data packet (n+1) because the sequence numbers n and n+2 of the received correct downlink data packet are discontinuous, and the second transmission terminal 2 sends retransmission control information (n+1) to the first transmission terminal 1. After receiving the retransmission control information (n+1), the first transmission terminal 1 retransmits the downlink data packet (n+1), and the second transmission terminal 2 receives the downlink data packet (n+1).

Another application embodiment of the present invention provides another method for the second transmission terminal 2 to judge the correctness of the downlink data packet: when the second transmission terminal 2 receives a downlink data packet, it judges whether the next downlink data packet has not been received after a first preset time.

Figure 5:
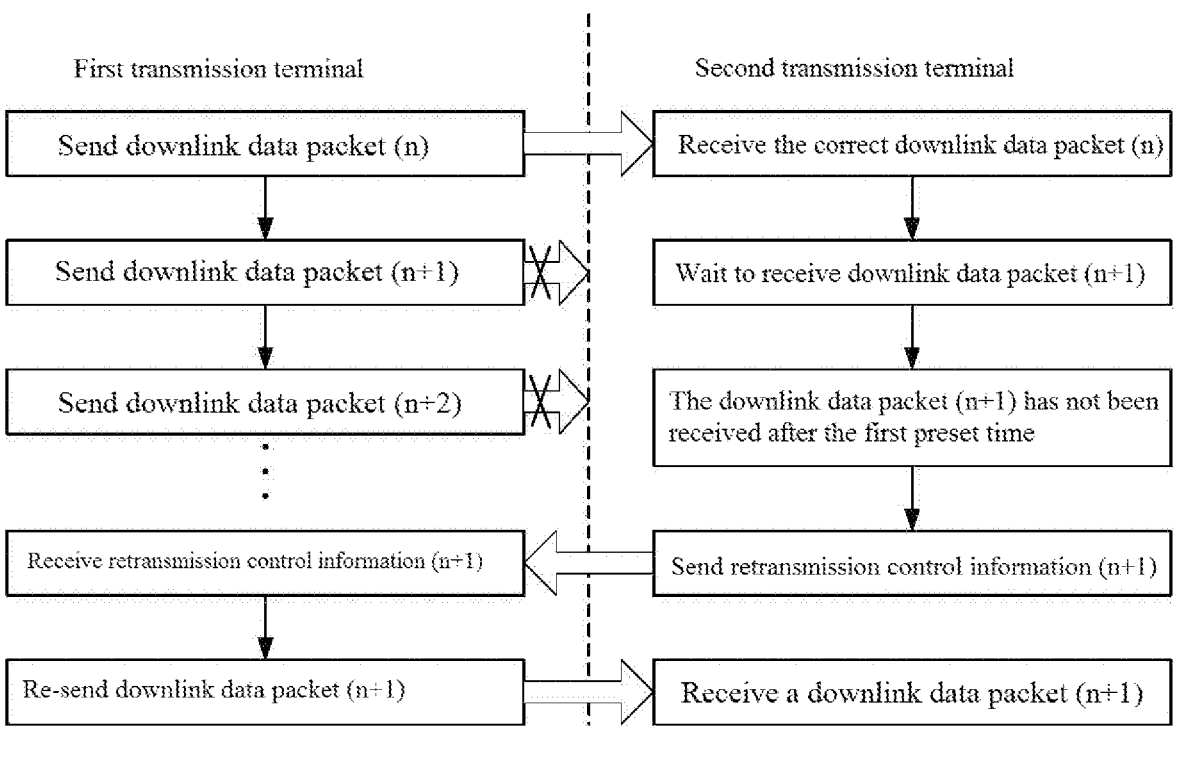
FIG. 5 is a data retransmission flow chart of a physical layer retransmission control method of the present inven-

As shown in FIG. 5, the first transmission terminal 1 sends a downlink data packet (n) to the second transmission terminal 2, and the second transmission terminal 2 waits to receive the downlink data packet (n+1) after receiving the correct downlink data packet (n). The first transmission terminal 1 sends downlink data packets including downlink data packet (n+1) and downlink data packets (n+2) with sequence numbers after n to the second transmission terminal 2, but these downlink data packets are incorrectly received by the second transmission terminal 2 due to errors during transmission. If the second transmission terminal 2 has not received the downlink data packet (n+1) after the first preset time, it is determined that the downlink data packet (n+1) has an error, and the second transmission terminal 2 sends retransmission control information (n+1) to the first transmission terminal 1. After receiving the retransmission control information (n+1), the first transmission terminal 1 retransmits the downlink data packet (n+1), and the second transmission terminal 2 receives the downlink data packet (n+1).

Another application embodiment of the present invention provides another method for the second transmission terminal 2 to judge the correctness of the downlink data packet: when the second transmission terminal 2 sends the retransmission control information, it judges whether the downlink data packet with the retransmission data packet sequence number has not been received after a second preset time.

As shown in FIG. 6, the downlink data packet (n) sent by the first transmission terminal 1 is not correctly received by the second transmission terminal 2 due to an error in the transmission process. After determining that the downlink data packet (n) has an error, the second transmission terminal 2 sends retransmission control information (n) to the first transmission terminal 1, waiting to receive the retransmitted downlink data packet (n). After receiving the retransmission control information (n), the first transmission terminal 1 retransmits the downlink data packet (n) to the second transmission terminal 2, but the downlink data packet (n) has not been correctly received by the second transmission terminal 2 due to an error in the transmission process. If the second transmission terminal 2 has not received the downlink data packet (n) for more than a second preset time, it determines that the downlink data packet (n) has an error, and sends the retransmission control information (n) to the first transmission terminal 1 again. After receiving the retransmission control information (n), the first transmission terminal 1 retransmits the downlink data packet (n), and the second transmission terminal 2 receives the downlink data packet (n).

In an application embodiment of the present invention, after receiving the retransmission control information, the first transmission terminal 1 retransmits only the downlink data packet with the retransmission data packet sequence number to the second transmission terminal 2.

As shown in FIG. 7, the downlink data packet (n2) sent by the first transmission terminal 1 is not correctly received by the second transmission terminal 2 due to an error during transmission. The first transmission terminal 1 sends the downlink data packet (n1) to the second transmission terminal 2, and the second transmission terminal 2 sent retransmission control information (n2) to the first transmission terminal 1 after receiving the downlink data packet (n1). After receiving the downlink packet (n1), the second transmission terminal 2 determines that the downlink packet (n2) has an error, and sends retransmission control information (n2) to the first transmission terminal 1. After receiving the retransmission control information (n2), the first transmission terminal 1 retransmits the downlink data packet (n2), and the second transmission terminal 2 receives the downlink data packet (n2). The first transmission terminal 1 sends downlink data packets including downlink data packet (n1+1) and downlink data packets (n1+2) with sequence numbers after n1 to the second transmission terminal 2, and the second transmission terminal 2 receives these downlink data packets.

In another application embodiment of the present invention, after receiving the retransmission control information, the first transmission terminal 1 retransmits the downlink data packet with the retransmission data packet sequence number and all downlink data packets with the sequence number thereafter to the second transmission terminal 2.

As shown in FIG. 8, the downlink data packet (n2) sent by the first transmission terminal 1 is not correctly received by the second transmission terminal 2 due to an error during transmission. The first transmission terminal 1 sends the downlink data packet (n1) to the second transmission terminal 2. After receiving the downlink packet (n1), the second transmission terminal 2 determines that the downlink packet (n2) has an error, and sends retransmission control information (n2) to the first transmission terminal 1. After receiving the retransmission control information (n2), the first transmission terminal 1 retransmits downlink data packets including the downlink data packet (n2), downlink data packets (n2+1) and downlink data packets (n2+2) with sequence numbers after n2, and the second transmission terminal 2 receives these downlink data packets.

In another application embodiment of the present invention, the retransmission control information further comprises a multi-data packet retransmission enable field. After receiving the retransmission control information, the first transmission terminal 1 retransmits only the downlink data packet with the retransmission data packet sequence number to the second transmission terminal 2, or the first transmission terminal 1 retransmits the downlink data packet with the retransmission data packet sequence number and all downlink data packets with the sequence number after the retransmission data packet sequence number to the second transmission terminal 2 according to the multi-data packet retransmission enable field.

If the value of the multi-data packet retransmission enable field comprised in the retransmission control information (n) is m, the retransmission control information is recorded as retransmission control information (n, m).

As shown in FIG. 9, the downlink data packet (n2) sent by the first transmission terminal 1 is not correctly received by the second transmission terminal 2 due to an error during transmission. The first transmission terminal 1 sends the downlink data packet (n1) to the second transmission terminal 2. After receiving the downlink packet (n1), the second transmission terminal 2 determines that the downlink packet (n2) has an error, and sends retransmission control information (n2,m) to the first transmission terminal 1. After receiving the retransmission control information (n2,m), the first transmission terminal 1 retransmits the downlink data packet (n2), and the second transmission terminal 2 receives the downlink data packet (n2). The first transmission terminal 1 judges the value of m; if m is 0, it sends downlink data packets including the downlink data packet (n1+1) and downlink data packet (n1+2) with sequence numbers after n1 to the second transmission terminal 2; if m is not 0, downlink data packets such as downlink data packets (n2+1) and downlink data packets (n2+2) with sequence numbers after n2 are sent to the second transmission terminal 2, and the second transmission terminal 2 receives these downlink data packets.

The second transmission terminal 2 can set the value of m in the retransmission control information (n, m) to be non-zero when the receiving memory for receiving the downlink data packet is to be full or is already full, and at the same time, empty the receiving memory and wait for receiving the retransmitted downlink data packet (n) and all downlink data packets with sequence numbers after n, so as to avoid the overflow of the receiving memory.

The downlink data packet also comprises an abnormal state field to indicate the abnormal data state of the first transmission terminal 1. The downlink data packet sent by the first transmission terminal 1 is stored in the sending memory 11 in the first transmission terminal 1. When the first transmission terminal 1 receives the retransmission control information, it tries to read the downlink data packet that needs to be retransmitted from the sending memory 11, that is, the downlink data packet with the retransmission data packet sequence number. If the downlink data packet has been overwritten with new data, the downlink data packet that needs to be retransmitted cannot be read from the sending memory 11. At this time, the first transmission terminal 1 is in an abnormal data state.

If the value of the abnormal state field comprised in the downlink data packet (n) is e, the downlink data packet is recorded as a downlink data packet (n,e).

In an application embodiment of the present invention, when the first transmission terminal 1 has an abnormal data state, the first transmission terminal 1 modifies the value of the abnormal state field in the downstream data packet that is subsequently sent. When the value of the abnormal state field in the downlink data packet received by the second transmission terminal 2 is different from the value of the abnormal state field in the downlink data packet received last time, the waiting for the downlink data packet to be retransmitted is given up.

As shown in FIG. 10, the downlink data packet (n2) sent by the first transmission terminal 1 is not correctly received by the second transmission terminal 2 due to an error during transmission. The first transmission terminal 1 sends the downlink data packet (n1,e) to the second transmission terminal 2, and the second transmission terminal 2 sent retransmission control information (n2) to the first transmission terminal 1 after receiving the downlink data packet (n1,e). After receiving the retransmission control information (n2), the first transmission terminal 1 tries to read the downlink data packet to be retransmitted from the transmission memory 11 (n2).

If the downlink data packet (n2) is successfully read from the sending memory 11, the first transmission terminal 1 retransmits the downlink data packet (n2,e) to the second transmission terminal 2, and then transmits downlink data packets such as the downlink data packet (n1+1, e) and the downlink data packet (n1+2,e) with the sequence number after n1 to the second transmission terminal 2, wherein the downlink data packet (n2,e) has an error in the transmission process and has not been correctly received by the second transmission terminal 2. Since the value e of the abnormal state field in the downlink data packet received by the second transmission terminal 2 has not changed, the second transmission terminal 2 can send retransmission control information (n2) again after waiting for the retransmission data to time out.

If the downlink data packet has been overwritten by new data and the downlink data packet (n2) cannot be read from the sending memory 11, the first transmission terminal 1 has an abnormal data state, and the first transmission terminal 1 modifies the value of the abnormal state field in the subsequent downlink data packet to be !e, the first transmission terminal 1 sends downlink data packets such as downlink data packet (n1+1, !e), downlink data packet (n1+2,!e) with the sequence number after n1 to the second transmission terminal 2, where !E represents the value of the abnormal state field different from e. Because the value of the abnormal state field in the downlink data packet (n1+1,!e) received by the second transmission terminal 2 is different from the value of the abnormal state field in the last downlink data packet (n1,e), the second transmission terminal 2 gives up waiting for the downlink data packet (n2) and does not send retransmission control information (n2).

In an application embodiment of the present invention, after repeatedly sending retransmission control information comprising the same retransmission data packet sequence number for a preset number of times, the second transmission terminal 2 gives up waiting for the downlink data packet if it still does not receive the downlink data packet with the retransmission data packet sequence number.

As shown in FIG. 11, the downlink data packet (n2) sent by the first transmission terminal 1 is not correctly received by the second transmission terminal 2 due to an error in the transmission process. After determining that the downlink data packet (n) has an error, the second transmission terminal 2 sends retransmission control information (n) to the first transmission terminal 1 and waits to receive the retransmitted downlink data packet (n). After receiving the retransmission control information (n), the first transmission terminal 1 retransmits the downlink data packet (n) to the second transmission terminal 2, but the downlink data packet (n) is not correctly received by the second transmission terminal 2 due to an error in the transmission process. If the second transmission terminal 2 still does not receive the downlink data packet (n) after a second preset time, it judges that there is an error in the downlink data packet (n), and sends retransmission control information (n) to the first transmission terminal 1 again. After repeatedly sending the retransmission control information (n) for a preset number of times, if the downlink data packet (n) is still not received, the second transmission terminal 2 gives up waiting for the downlink data packet (n) and does not send the retransmission control information (n) any more.

In another application embodiment of the present invention, the retransmission control information further includes a forced abnormal state transition field. After repeatedly sending the retransmission control information comprising the same retransmission data packet sequence number for a preset number of times, the second transmission terminal 2 judges whether the downlink data packet with the sequence number of the retransmission data packet has not been received, and sets the forced abnormal state transition field according to the judgment result. When the forced abnormal state transition field in the received retransmission control information is a preset value, the first transmission terminal 1 modifies the value of the abnormal state field in the downstream data packet sent subsequently.

If the value of the forced abnormal state transition field comprised in the retransmission control information (n,m) is f, the retransmission control information is recorded as the retransmission control information (n,m,f).

As shown in FIG. 12, the downlink data packet (n2) sent by the first transmission terminal 1 is not correctly received by the second transmission terminal 2 due to an error during transmission. The first transmission terminal 1 sends the downlink data packet (n1,e) to the second transmission terminal 2. After receiving the downlink data packet (n1,e), the second transmission terminal 2 determines that the downlink data packet (n2) has an error, and sends retransmission control information (n2,0,0) to the first transmission terminal 1, where the retransmission data packet sequence number is n2, the value of the multi-packet retransmission enable field is 0, and the value of the forced abnormal state transition field is 0. After receiving the retransmission control information (n2,0,0), the first transmission terminal 1 retransmits the downlink data packet (n2,e) to the second transmission terminal 2, but the downlink data packet (n2,e) is not correctly received by the second transmission terminal 2 due to an error in the transmission process. The second transmission terminal 2 still does not receive the downlink data packet (n2,e) after the second preset time, determines that there is an error in the downlink data packet (n2,e), and sends the retransmission control information (n2,0,0) to the first transmission terminal 1 again. After repeatedly sending the retransmission control information (n2,0,0) for a preset number of times, if the downlink data packet (n2,e) is still not received, the second transmission terminal 2 sets the value of the forced abnormal state transition field in the retransmission control information to 1 and sends the retransmission control information (n2,0,1) to the first transmission terminal 1. After receiving the retransmission control information (n2,0,1), the first transmission terminal 1 modifies the value of the abnormal state field in the subsequent downlink data packet as 1! e, the first transmission terminal 1 sends a downlink data packet (n1+1,!e) with a sequence number after n1, where i!e represents the value of the abnormal state field different from e. Because the value of the abnormal state field in the downlink data packet (n1+1,!e) received by the second transmission terminal 2 is different from the value of the abnormal state field in the last downlink data packet (n1,e), the second transmission terminal 2 gives up waiting for the downlink data packet (n2) and does not send the retransmission control information (n2,0,1).

The retransmission control information further comprises an abnormal state return field, and the second transmission terminal 2 sets the abnormal state return field in the retransmission control information as the value of the abnormal state field in the downlink data packet received before sending the retransmission control information. When the value of the abnormal state return field in the received retransmission control information is different from that in the current downlink data packet, the first transmission terminal 1 ignores the retransmission control information.

If the value of the abnormal state return field comprised in the retransmission control information (n,m,f) is e, the retransmission control information is recorded as the retransmission control information (n,m,f,e).

As shown in FIG. 13, the downlink data packet (n2) sent by the first transmission terminal 1 is not correctly received by the second transmission terminal 2 due to an error during transmission, and the first transmission terminal 1 sends the downlink data packet (n1,e) to the second transmission terminal 2. After receiving the downlink packet (n1,e), the second transmission terminal 2 determines that the downlink packet (n2) has an error, and sends retransmission control information (n2,0,0,e) to the first transmission terminal 1, where the retransmission data packet sequence number is n2, the value of the multi-data packet retransmission enable field is 0, the value of the forced abnormal state transition field is 0, and the value of the abnormal state return field is e. After receiving the retransmission control information (n2,0,0,e), the first transmission terminal 1 attempts to read the downlink data packet (n2) that needs to be retransmitted from the sending memory 11. If the downlink data packet has been overwritten by new data and the downlink data packet (n2) cannot be read from the sending memory 11, the first transmission terminal 1 has an abnormal data state, and the first transmission terminal 1 modifies the value of the abnormal state field in the subsequent downlink data packet to be !e. The first transmission terminal 1 sends a downlink data packet (n1+1, !e), the first transmission terminal 1 sends a downlink data packet (n1+1,! e) with a sequence number after n1 to the second transmission terminal 2, where !e represents the value of the abnormal state field different from e. When the downlink data packet (n1+1,!e) is incorrectly received by the second transmission terminal 2 in the transmission process, the second transmission terminal 2 still does not receive the downlink data packet (n2) after a second preset time, and then sends the retransmission control information (n2,0,0,e) again. The first transmission terminal 1 receives the retransmission control information (n2,0,0,e), and since the value of the abnormal state return field is e, which is different from the value of the abnormal state field in the current downlink data packet, the first transmission terminal 1 ignores the retransmission control information (n2,0,0,e), and continues to send the subsequent downlink data packets.

The above is only the preferred embodiment of the present invention, but the protection scope of the present invention is not limited to this, and any changes or substitutions that can be easily thought of by those familiar with the technical field within the technical scope disclosed by the present invention should be included in the protection scope of the present invention.

What is claimed is:

1. A physical layer retransmission control method for performing retransmission control on a transmission system, the transmission system comprising a first transmission terminal, a second transmission terminal and a transmission channel, and the physical layer retransmission control method comprising:

transmitting, by the first transmission terminal, downlink data packets to the second transmission terminal through the transmission channel, wherein each downlink data packet of the downlink data packets comprises a sequence number and an abnormal state field, the abnormal state field is used to indicate a data abnormal state of the first transmission terminal, and wherein a plurality of sequence numbers comprised in a plurality of consecutive downlink data packets are arranged in sequence according to an order of transmission, judging, by the second transmission terminal upon receiving one of the downlink data packets transmitted by the first transmission terminal, a correctness of the downlink data packets, if it is judged by the second transmission terminal that one of the downlink data packets has an error, generating, by the second transmission terminal, retransmission control information, transmitting, by the second transmission terminal, the retransmission control information to the first transmission terminal through the transmission channel, wherein the retransmission control information comprises a retransmission data packet sequence number, and transmitting, by the second transmission terminal, the one of the downlink data packets to the first transmission terminal, retransmitting, by the first transmission terminal, the one of the downlink data packets to the second transmission terminal according to the retransmission control information, when the one of the downlink data packets to be retransmitted is not readable from a sending memory, judging the first transmission terminal to have the data abnormal state, and when the data abnormal state occurs at the first transmission terminal, modifying, by the first transmission terminal, a value of the abnormal state field in a downlink data packet transmitted subsequently.

2. The physical layer retransmission control method according to claim 1, wherein the physical layer retransmission control method for judging the correctness of the downlink data packets comprises:

decoding and judging, by the second transmission terminal, check codes in the received downlink data packets.

3. The physical layer retransmission control method according to claim 1, wherein the physical layer retransmission control method for judging the correctness of the downlink data packets comprises:

determining, by the second transmission terminal, continuity of sequence numbers in the received downlink data packets.

4. The physical layer retransmission control method according to claim 1, wherein the physical layer retransmission control method for judging the correctness of the downlink data packets comprises:

after receiving a current one of the downlink data packets, judging, by the second transmission terminal, whether a next downlink data packet has not been received after a first preset time.

5. The physical layer retransmission control method according to claim 1, wherein the physical layer retransmission control method for judging the correctness of the downlink data packets comprises:

after the second transmission terminal sends the retransmission control information, judging whether a downlink data packet with the retransmission data packet sequence number has not been received after a second preset time.

6. The physical layer retransmission control method according to claim 1, wherein the physical layer retransmission control method for retransmitting, by the first transmission terminal, the one of the downlink data packet to the second transmission terminal according to the retransmission control information comprises:

retransmitting, by the first transmission terminal, only the downlink data packet with the retransmission data packet sequence number to the second transmission terminal.

7. The physical layer retransmission control method according to claim 1, wherein the physical layer retransmission control method for retransmitting, by the first transmission terminal, the one of the downlink data packet to the second transmission terminal according to the retransmission control information comprises:

retransmitting, by the first transmission terminal, the downlink data packet with the retransmission data packet sequence number and all subsequent downlink data packets with sequence numbers after the retransmission data packet sequence number to the second transmission terminal.

8. The physical layer retransmission control method according to claim 1, wherein the retransmission control information further comprises a multi-data packet retransmission enable field, and the physical layer retransmission control method for retransmitting, by the first transmission terminal, the one of the downlink data packet to the second transmission terminal according to the retransmission control information comprises:

retransmitting, by the first transmission terminal, only the downlink data packet with the retransmission data packet sequence number to the second transmission terminal, or retransmitting, by the first transmission terminal, the downlink data packet with the retransmission data packet sequence number and all subsequent downlink data packets with sequence numbers after the retransmission data packet sequence number to the second transmission terminal.

9. The physical layer retransmission control method according to claim 1, wherein, when the value of the abnormal state field in the downlink data packet received by the second transmission terminal is different from the value of the abnormal state field in the downlink data packet received last time, the second transmission terminal gives up waiting for the downlink data packet to be retransmitted.

10. The physical layer retransmission control method according to claim 1, wherein, after repeatedly transmitting retransmission control information comprising the same retransmission data packet sequence number for a preset number of times, the second transmission terminal gives up waiting for the downlink data packet if the downlink data packet with the retransmission data packet sequence number has not been received.

11. The physical layer retransmission control method according to claim 1, wherein the retransmission control information further comprises a forced abnormal state transition field, and the physical layer retransmission control method further comprises:

after repeatedly transmitting retransmission control information comprising the same retransmission data packet sequence number for a preset number of times, judging, by the second transmission terminal, whether the downlink data packet with the retransmission data packet sequence number has not been received, and setting, by the second transmission terminal, a forced abnormal state transition field according to a judgment result, and when the forced abnormal state transition field in the received retransmission control information is a preset value, modifying, by the first transmission terminal, the value of the abnormal state field in the downlink data packet transmitted subsequently.

12. The physical layer retransmission control method according to claim 1, wherein the retransmission control information further comprises a forced abnormal state return field, and the physical layer retransmission control method further comprises:

setting, by the second transmission terminal, the abnormal state return field in the retransmission control information as the value of the abnormal state field in the downlink data packet received before transmitting the retransmission control information, and when the value of the abnormal state return field in the received retransmission control information is different from that in the current downlink data packet, ignoring, by the first transmission terminal, the retransmission control information.

13. A physical layer retransmission control method for performing retransmission control on a transmission system, the transmission system comprising a first transmission terminal, a second transmission terminal and a transmission channel, and the physical layer retransmission control method comprising:

transmitting, by the first transmission terminal, downlink data packets to the second transmission terminal through the transmission channel, wherein each downlink data packet of the downlink data packets comprises a sequence number and an abnormal state field, the abnormal state field is used to indicate a data abnormal state of the first transmission terminal, and wherein a plurality of sequence numbers comprised in a plurality of consecutive downlink data packets are arranged in sequence according to an order of transmission, judging, by the second transmission terminal upon receiving one of the downlink data packets transmitted by the first transmission terminal, a correctness of the downlink data packets, if it is judged by the second transmission terminal that one of the downlink data packets has an error, generating, by the second transmission terminal, retransmission control information, transmitting, by the second transmission terminal, the retransmission control information to the first transmission terminal through the transmission channel, wherein the retransmission control information comprises a retransmission data packet sequence number, and transmitting, by the second transmission terminal, the one of the downlink data packets to the first transmission terminal, retransmitting, by the first transmission terminal, the one of the downlink data packets to the second transmission terminal according to the retransmission control information, and when the one of the downlink data packets to be retransmitted is not readable from a sending memory, judging the first transmission terminal to have the data abnormal state, wherein if it is judged by the second transmission terminal that a correct downlink data packet of the downlink data packets does not have an error, the second transmission terminal does not perform feedback confirmation on the correct downlink data packet.

14. The physical layer retransmission control method according to claim 13, wherein the physical layer retransmission control method for judging the correctness of the downlink data packets comprises:

decoding and judging, by the second transmission terminal, check codes in the received downlink data packets.

15. The physical layer retransmission control method according to claim 13, wherein the physical layer retransmission control method for judging the correctness of the downlink data packets comprises:

determining, by the second transmission terminal, continuity of sequence numbers in the received downlink data packets.

16. The physical layer retransmission control method according to claim 13, wherein the physical layer retransmission control method for judging the correctness of the downlink data packets comprises:

after receiving a current one of the downlink data packets, judging, by the second transmission terminal, whether a next downlink data packet has not been received after a first preset time.

17. The physical layer retransmission control method according to claim 13, wherein the physical layer retransmission control method for judging the correctness of the downlink data packets comprises:

after the second transmission terminal sends the retransmission control information, judging whether a downlink data packet with the retransmission data packet sequence number has not been received after a second preset time.

18. The physical layer retransmission control method according to claim 13, wherein the physical layer retransmission control method for retransmitting, by the first transmission terminal, the one of the downlink data packet to the second transmission terminal according to the retransmission control information comprises:

retransmitting, by the first transmission terminal, only the downlink data packet with the retransmission data packet sequence number to the second transmission terminal.

19. The physical layer retransmission control method according to claim 13, wherein the physical layer retransmission control method for retransmitting, by the first transmission terminal, the one of the downlink data packet to the second transmission terminal according to the retransmission control information comprises:

retransmitting, by the first transmission terminal, the downlink data packet with the retransmission data packet sequence number and all subsequent downlink data packets with sequence numbers after the retransmission data packet sequence number to the second transmission terminal.

20. The physical layer retransmission control method according to claim 13, further comprising:

when the data abnormal state occurs at the first transmission terminal, modifying, by the first transmission terminal, a value of the abnormal state field in a downlink data packet transmitted subsequently, wherein when the value of the abnormal state field in the downlink data packet received by the second transmission terminal is different from the value of the abnormal state field in the downlink data packet received last time, the second transmission terminal gives up waiting for the downlink data packet to be retransmitted.

* * * * *